United States Patent
Luddy

(10) Patent No.: US 6,741,564 B2
(45) Date of Patent: *May 25, 2004

(54) METHOD IMPLEMENTED BY A BASE STATION FOR SELECTIVELY SUPPRESSING COMMUNICATIONS

(75) Inventor: Michael J. Luddy, Sea Cliff, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/087,640

(22) Filed: Feb. 28, 2002

(65) Prior Publication Data

US 2002/0089932 A1 Jul. 11, 2002

Related U.S. Application Data

(63) Continuation of application No. 09/354,042, filed on Jul. 15, 1999, which is a continuation of application No. 08/671,067, filed on Jun. 27, 1996, now Pat. No. 5,953,346.

(51) Int. Cl.[7] .............................................. G01B 31/08
(52) U.S. Cl. ...................... 370/232; 370/358; 370/466; 370/467; 370/468
(58) Field of Search ................. 370/358, 466, 370/467, 468, 469, 485, 538–545, 205, 204, 350, 353, 231–235, 241, 247, 248, 252, 253, 276, 277, 296, 320, 335, 342, 321, 348, 442, 447, 470, 465, 441, 437, 359, 360, 391; 379/222, 225, 237, 238, 239; 375/356, 355, 224, 225, 240, 241, 242; 455/428, 432.2, 453, 452.2, 450

(56) References Cited

U.S. PATENT DOCUMENTS

| | | |
|---|---|---|
| 3,700,820 A | 10/1972 | Blasbalg et al. |
| 3,761,610 A | 9/1973 | Krallinger et al. |
| 4,069,392 A | 1/1978 | Goldenberg et al. |
| 4,384,307 A | 5/1983 | Kuzmik et al. |
| 4,385,206 A | 5/1983 | Bradshaw et al. |
| 4,583,124 A | 4/1986 | Tsuji et al. |
| 4,630,126 A | 12/1986 | Kaku et al. |
| 5,050,004 A | 9/1991 | Morton, Jr. |
| 5,105,423 A | 4/1992 | Tanaka et al. |
| 5,115,429 A | 5/1992 | Hluchyj et al. |
| 5,199,061 A | 3/1993 | Kim |
| 5,274,474 A | 12/1993 | Medina |
| 5,339,174 A | 8/1994 | Harris |
| 5,351,134 A | 9/1994 | Yaguchi et al. |
| 5,418,624 A | 5/1995 | Ahmed |
| 5,563,912 A | 10/1996 | Yasunaga |
| 5,953,346 A * | 9/1999 | Luddy ........................ 370/465 |
| 6,018,528 A | 1/2000 | Gitlin et al. |
| 6,072,787 A | 6/2000 | Hamalainen et al. |
| 6,088,335 A | 7/2000 | I et al. |
| 6,122,292 A | 9/2000 | Watanabe et al. |
| 6,608,825 B1 * | 8/2003 | Luddy ........................ 370/342 |
| 2002/0089976 A1 * | 7/2002 | Luddy ........................ 370/358 |
| 2002/0090000 A1 * | 7/2002 | Luddy ........................ 370/465 |

* cited by examiner

Primary Examiner—Dang Ton
(74) Attorney, Agent, or Firm—Volpe and Koenig, PC

(57) ABSTRACT

A method implemented by a base station for suppressing selective communications during communication rate modification, wherein the base station is coupled between first and said second communicating nodes, includes establishing a communication channel between said first and said second nodes at a first data rate; detecting a transmission from the first node on the channel; determining whether the transmission requires a change in data rates to a second data rate; switching the communication channel to said second data rate; and blocking transmissions from the second node until the second communication rate has been established.

20 Claims, 5 Drawing Sheets

METHOD IMPLEMENTED BY A BASE STATION FOR SELECTIVELY SUPPRESSING COMMUNICATIONS

CROSS REFERENCE TO RELATED APPLICATIONS

This application is a continuation of application Ser. No. 09/354,042, filed Jul. 15, 1999, which is a continuation of application Ser. No. 08/671,067, filed Jun. 27, 1996 now U.S. Pat. No. 5,953,346, issued Sep. 14, 1999 which application(s) are incorporated herein by reference.

BACKGROUND

1. Field of the Invention

This invention generally relates to wireless communication systems. More particularly, the invention relates to a wireless digital CDMA communication system that selectively adjusts the data transmission rate depending upon the bandwidth required by the communication without the loss of data during the transmission rate adjustment.

2. Description of Related Art

The telecommunications industry has recently experienced strong growth in the use of wireless technology including cellular, satellite and microwave communications. As the popularity and use of wireless communication systems has increased, the finite bandwidth allocated to each type of wireless communication has become increasingly valuable. Since it is unlikely that additional bandwidth to support user growth will be allocated for existing applications, many of the recent advances in telecommunication hardware and software have been directed toward increasing the transmission rate of data while utilizing the same or a decreased bandwidth.

One of the problems associated with wireless communication of data is that many different types of communicating nodes are currently in use including computers, facsimile machines, automatic calling and answering equipment and other types of data networks. These nodes may be able to communicate at a plurality of different data rates and must be properly synchronized to avoid losing data during the establishment or maintenance of a communication.

The establishment and synchronization of communications is currently performed using a variety of different techniques. For example, the system disclosed in U.S. Pat. No. 4,384,307 (Kuzmik et al.) includes a communication adapter for interfacing a transceiver to a communication line. The system requires bit level manipulation of data to properly synchronize two communicating nodes. Reformatting of data using this technique is computationally expensive and prone to errors.

Another type of system is disclosed in U.S. Pat. No. 4,583,124 (Tsuji et al.) which permits two nodes to quickly establish synchronization at a desired communication speed by storing information concerning each communicating node in memory. However, requiring an originating node to store information about each receiving node is impractical given today's communication environment.

Accordingly, there is a need for a simple and effective technique for switching the data transmission rate of a communication network to the required rate while preserving the integrity of the data transmitted between two communicating nodes.

SUMMARY

The present invention is a CDMA communication system which prevents the transmission of data between communicating nodes until the data communication rate required by the communicating nodes has been completely established throughout the system. The system selectively suppresses the confirmation tone that a receiving node sends to an originating node. Accordingly, the transmission of voice, facsimile or modem data is prevented until the communication path has been established at the desired communication rate. This permits the system to reliably transport encoded data at a plurality of data rates across a telecommunication system which may lack precise synchronization.

Accordingly, it is an object of the present invention to provide a system and method for reliably transmitting encoded data by preventing communication of data until the communication system has achieved the data transmission rate required by communicating nodes.

Other objects and advantages of the present invention will become apparent after reading the description of a presently preferred embodiment.

BRIEF DESCRIPTION OF THE DRAWING(S)

DETAILED DESCRIPTION OF THE PREFERRED EMBODIMENT(S)

Figure 1:
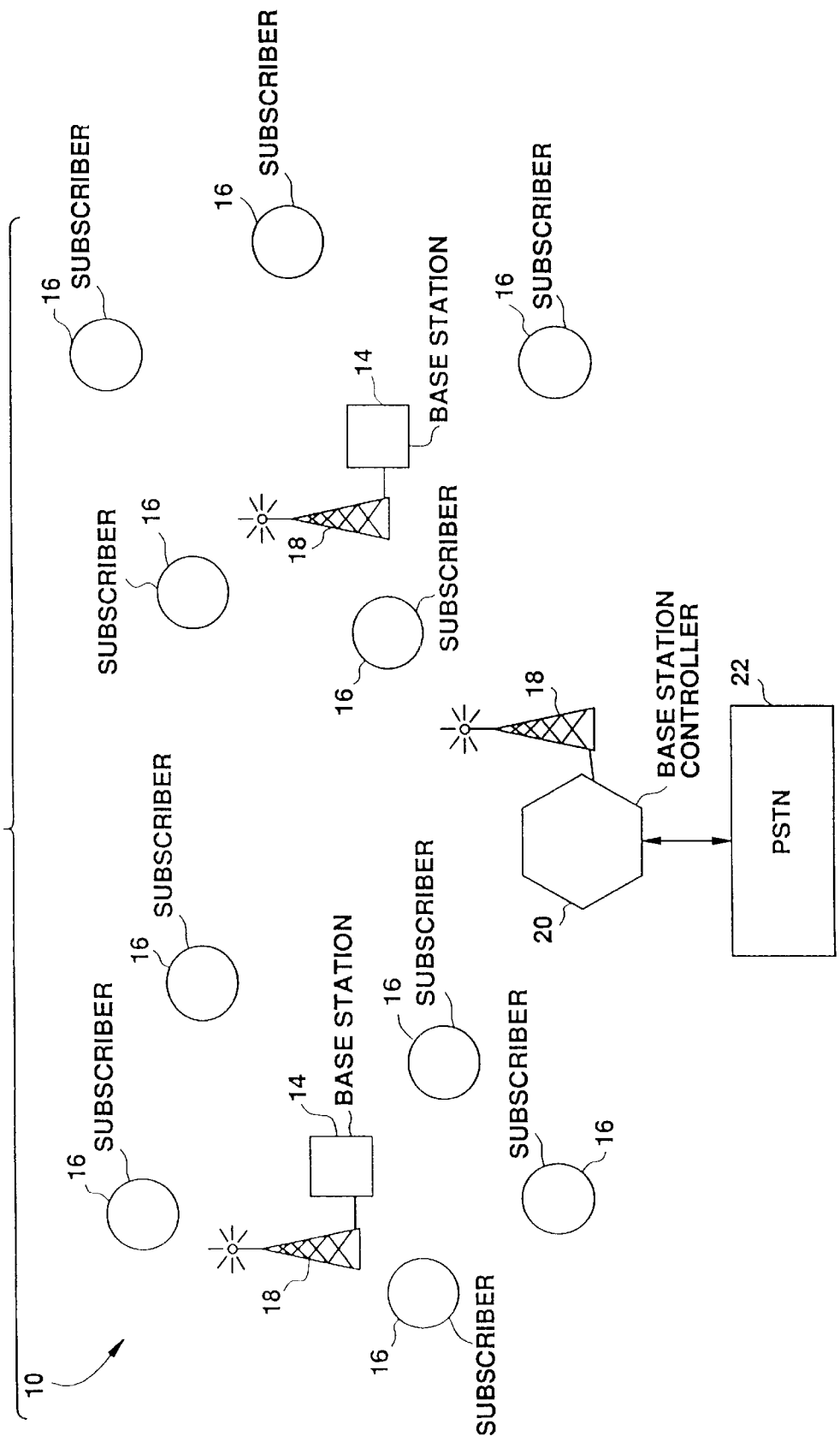
FIG. 1 is a schematic overview of a code division multiple access communication system in accordance with the present invention.

The preferred embodiment will be described with reference to the drawing figures where identical numerals represent similar elements throughout.

A communication network 10 embodying the present invention is shown in FIG. 1. The communication network 10 generally comprises one or more base stations 14, each of which is in wireless communication with a plurality of subscriber units 16, which may be fixed or mobile. Each subscriber unit 16 communicates with either the closest base station 14 or the base station 14 which provides the strongest communication signal. The base stations 14 also communicate with a base station controller 20 which coordinates communications among the base stations 14. The communication network 10 may also be connected to a public switched telephone network (PSTN) 22, wherein the base station controller 20 also coordinates communications between the base stations 14 and the PSTN 22. Preferably, each base station 14 communicates with the base station controller 20 over a wireless link. Although the link between the base stations 14 and the base station controller 20 is shown as a wireless link, it should be apparent to those skilled in the art that a land line between the base stations 14 and the base station controller 20 maybe provided. This is particularly applicable when a base station 14 is in close proximity to the base station controller 20.

The base station controller 20 performs several functions. Primarily, the base station controller 20 provides all of the overhead, administrative and maintenance (OA&M) signaling associated with establishing and maintaining all of wireless communications between the subscriber units 16, the base stations 14, and the base station controller 20. The base station controller 20 also provides an interface between the wireless communication system 10 and the PSTN 22. This interface includes multiplexing and demultiplexing of a plurality of communication signals that enter and leave the system 10 via the base station controller 20. Although the wireless communication system 10 is shown employing antennas to transmit RF signals, one skilled in the art will recognize that communications may be accomplished by microwave satellite uplinks.

Figure 2:
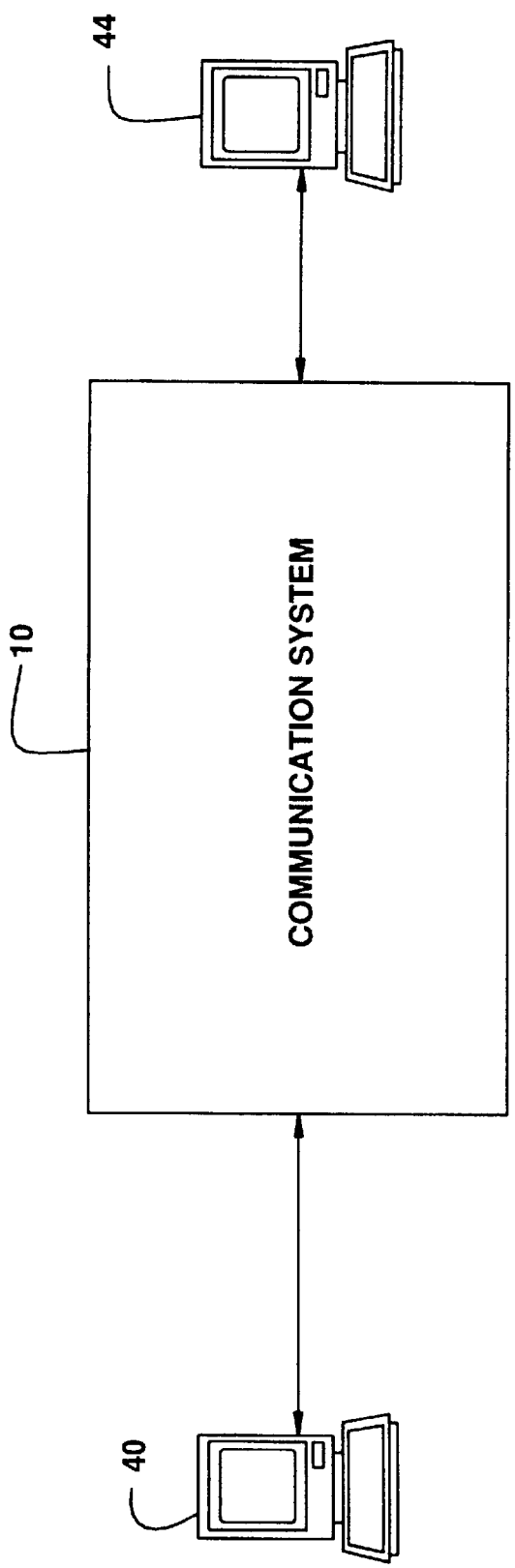
FIG. 2 is a block diagram of the communication system of FIG. 1 connected to originating and terminating nodes.

Referring to FIG. 2, the communication system 10 is generally connected to originating nodes 40 and terminating nodes 44. In order to conserve as much bandwidth as possible, the communication system 10 selectively allots the bandwidth required for supporting the data transmission rate required by the originating and terminating nodes 40, 44. In this manner, the system 10 ensures that the bandwidth is utilized efficiently. Voiced communications may be effectively transmitted across a 32 Kb/s adaptive pulse code modulation (ADPCM) channel. However, a high speed fax or data modem signal requires at least a 64 Kb/s pulse code modulation (PCM) signal to reliably transmit the communication. Many other types of modulation techniques and data transmission rates may also be utilized by originating and terminating nodes 40, 44. The system 10 must be able to effectively allocate bandwidth and dynamically switch between these data communication rates and modulation schemes on demand.

The communication system 10 provides a communication link between the originating and terminating nodes 40, 44. The originating and terminating nodes 40, 44 may comprise computers, facsimile machines, automatic calling and answering equipment, data networks or any combination of this equipment. For robust communication of data it is imperative to ensure that the communication system 10 switches to the data transmission rate required by the communicating nodes 40, 44 prior to the transmission of any data.

Figure 3:
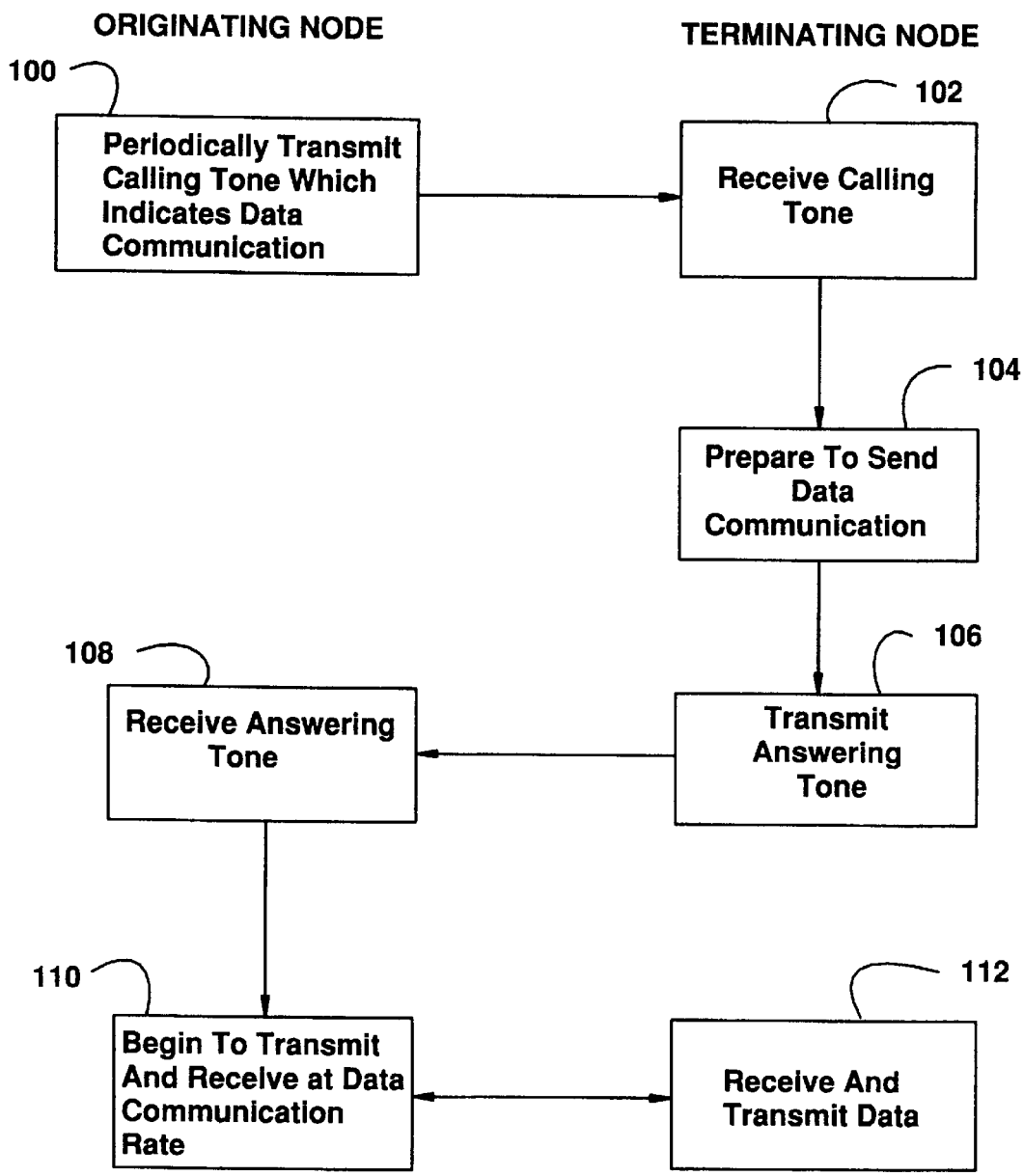
FIG. 3 is a flow diagram of the establishment of a communication channel between originating and terminating nodes in accordance with the prior art.

Referring to FIG. 3, the typical procedure for establishing communications between originating nodes 40 and terminating nodes 44 is shown. The originating node 40 periodically transmits a calling tone (step 100) which indicates that a data communication, (not a voice communication), is to be transmitted. The calling tone which is sent from the originating node 40 to the terminating node 44 is detected by the terminating node 44 (step 102) which initiates several actions. First, the terminating node 44 prepares to send a data communication (step 104). Next, the terminating node 44 transmits an answering tone (step 106) to the originating node 40 to confirm that the terminating node 44 has received the calling tone. Upon receipt of the answering tone (step 108), the originating node 40 begins the transmission of data (step 110), which is received by the terminating node 44 (step 112). With the communication link established at the data transmission rate, the originating and terminating 40, 44 nodes transmit and receive data until termination of the communication.

One problem with this process is that the transmission rate of the communication system 10 is transparent to both the originating and terminating nodes 40, 44. Modification of the transmission rate from a low rate (that supports voice communication) to a high rate (that supports encoded data communication) ensures that data will be reliably and quickly transmitted over a communication channel. However, the new transmission rate must be completely established throughout the communication system 10 to prevent false interpretation of tones transmitted by the originating node 40. The originating node 40 may begin transmission of data at a high rate before the system 10 has fully switched from 32 Kb/s ADPCM to 64 Kb/s PCM resulting in loss of data.

In order to obviate tone misinterpretation and to prevent the resulting erroneous operation of the originating or terminating nodes 40, 44, the present invention blocks the transmission of the confirming tone to the originating node 40 until the new data transmission rate has been completely established throughout the communication system 10. This prevents the reception of the answering tone at the originating node 40 and ensures the reliable transportation of encoded data at a higher rate across a communication system 10 which lacks the precise synchronization which would otherwise be required.

Figure 4:
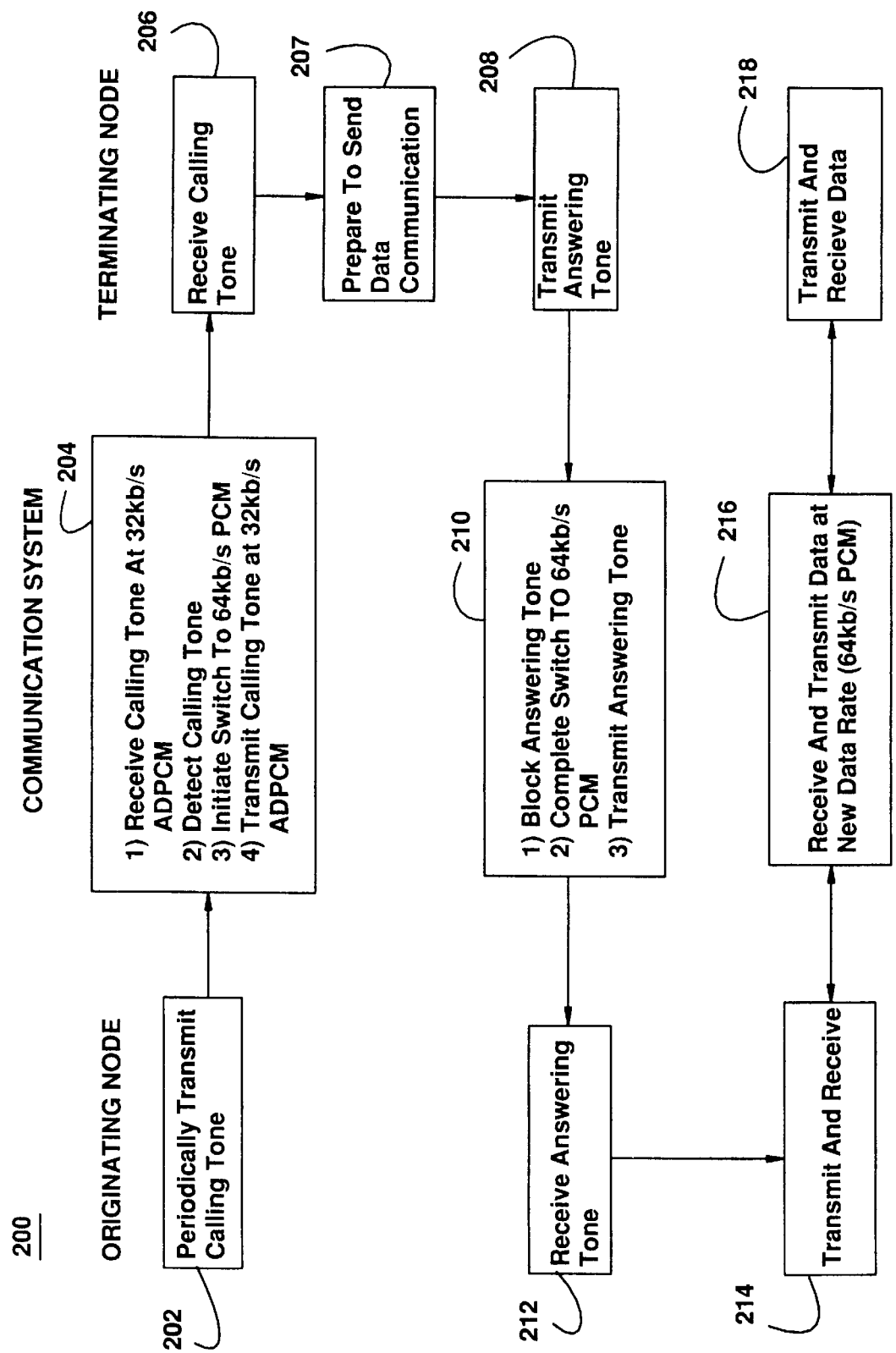
FIG. 4 is a flow diagram of the establishment of a communication channel between originating and terminating nodes in accordance with the present invention.

The operation of the system 10 of the present invention will be explained with reference to FIG. 4. The communication system 10 facilitates communications between an originating node 40 and a terminating node 44. As shown, the actions of the originating node 40 (steps 202, 212 and 214) and the actions of the terminating node 44 (steps 206, 207, 208 and 218) are the same as in FIG. 3. The operation of the communication system 10 is transparent to both the originating node 40 and the terminating node 44.

In operation, the originating node 40 periodically transmits a calling tone (step 202) which indicates a data communication. The communication system 10 performs several actions in response to receipt of the calling tone (step 204). First, the calling tone is received at 32 Kb/s ADPCM which is the standard communication setting for voice communications. The system 10 detects the calling tone and initiates a switch to 64 Kb/s PCM in order to handle the high-speed data transmission. This switch must be implemented by the base station 14, the subscriber unit 16 and the base station controller 20. Although the system 10 immediately begins the switching over to the new data transmission rate, the process takes approximately 1500 msec to implement. Accordingly, the system 10 transmits the calling tone to the terminating node 44 at 32 Kb/s ADPCM.

The terminating node 44 detects the calling tone (step 206) and prepares to send a data communication (step 207). The terminating node 44 subsequently transmits the answering tone (step 208) which, when received by the originating node, will cause the originating node 40 to begin transmission of data.

The communication system 10 receives the answering tone from the terminating node 44. However, the system 10 does not forward the answering tone to the originating node 40 until the switch to 64 Kb/s PCM has been established throughout the system 10. After the system 10 has confirmed that the switch to 64 Kb/s PCM has been achieved, it permits the answering tone to pass through to the originating node 40, which receives the tone (step 212). In response to the answering tone, the originating node 40 begins transmission of data (step 214). The system 10 receives the data and begins transmission of data at the new data transmission rate (64 Kb/s PCM) (step 216) to the terminating node 44 which receives the data (step 218). Since the communication channel has been established, the originating and terminating nodes 40, 44 continue to communicate over the system 10 in this manner (steps 214, 216 and 218) until the communication is terminated.

Figure 5:
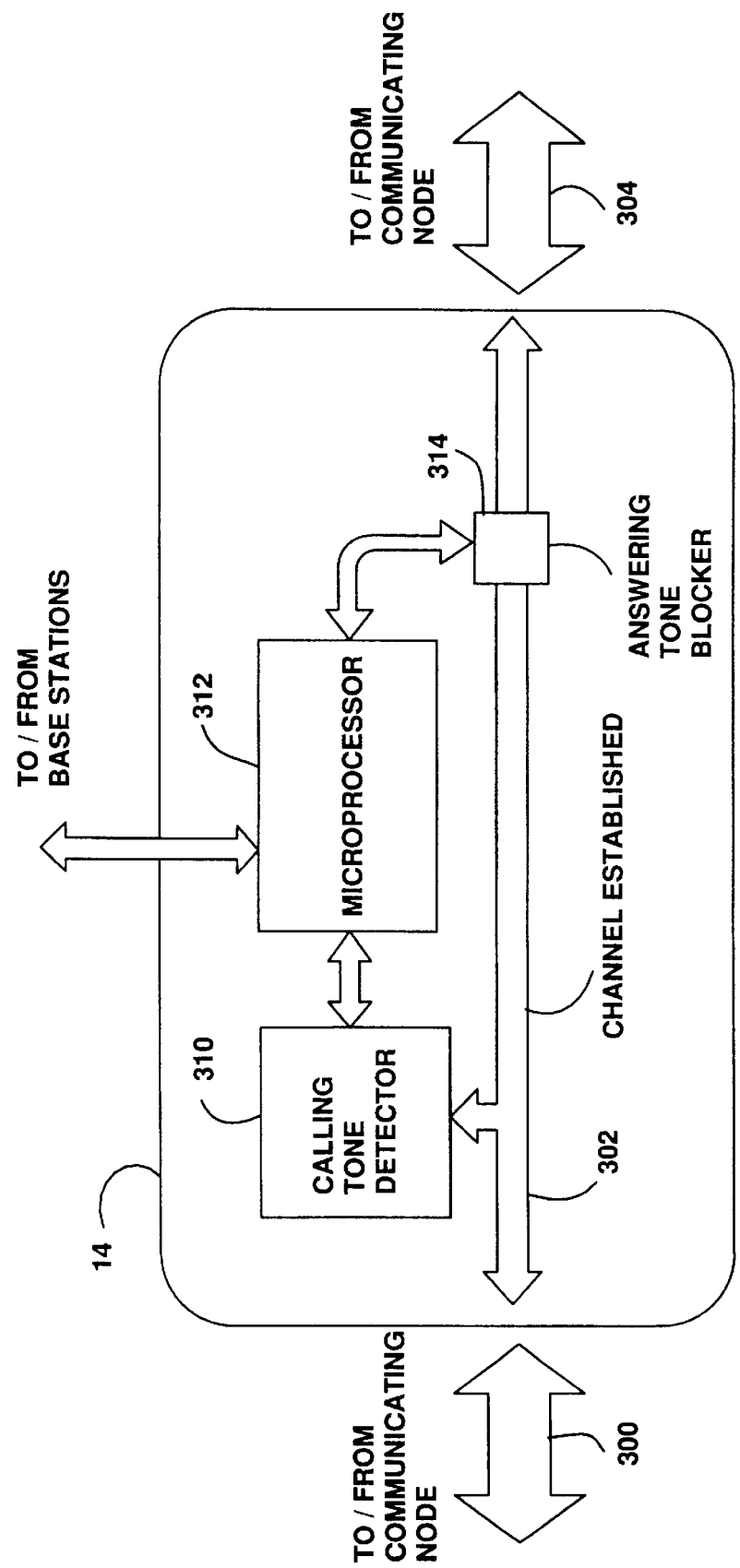
FIG. 5 is a block diagram of a base station in accordance with the teachings of the present invention.

Referring to FIG. 5, a more detailed block diagram of the base station controller 20 is shown. The base station controller 20 controls at least a portion of the communication link between two communicating nodes 40, 44. This link comprises the transmission path 300 from a first communicating node to the base station controller 20, the transmission path 302 within the base station controller 20, and the transmission path 304 from the base station controller 20 to the second communicating node. The transmission paths 300, 304 to and from the base station controller 20 may include a plurality of base stations 14 and subscriber units 16 which are controlled by the base station controller 20.

It should be appreciated by those of skill in the art that the establishment of a communication channel between communicating nodes 40, 44 is a complex procedure involving a plurality of tasks performed by the base station 14, the subscriber unit 16 and the base station controller 20. A detailed description of the entire procedure is outside the scope of the present invention. Accordingly, only those portions of the procedure for establishment of a communication channel relevant to the present invention will be described hereinafter.

The communications between an originating node 40 and a terminating node 44 are transmitted over a virtual channel as is well known by those of skill in the art. Since the entire spectrum is used by the CDMA communication system 10, communications from the originating node 40 to the terminating node 44 are transmitted over the same frequency band as communications from the terminating node 44 to the originating node 40. After the virtual channel has been established, the originating and terminating nodes 40, 44 may freely communicate.

The base station controller 20 includes a calling tone detector 310, a microprocessor 312 and an answering tone blocker 314. The calling tone detector 310 monitors the communication channel which has been established in order to detect the calling tone. When a calling tone is transmitted from an originating node 40, the calling tone detector 310 detects the calling tone, which causes the base station controller 20 to initiate the switch to a higher data transmission rate. The microprocessor 312 subsequently informs any other base stations 14 or subscriber units 16 through which the communication is to be routed (hereinafter called communicating equipment) to initiate the switch to the higher data transmission rate.

The microprocessor 312 activates the answering tone blocker 314 which will prevent the answering tone from being transmitted through the system 10. Each piece of communicating equipment 14, 16, 20 transmits an acknowledgment to the microprocessor 312 of the base station controller 20 when the higher data transmission rate has been achieved. The microprocessor 312 subsequently deactivates the answering tone blocker 314 which permits the answering tone to be forwarded to the originating node 40. The communicating nodes 40, 44 commence data transmission over the communication system 10 at the higher data transmission rate.

Although the invention has been described in part by making detailed reference to the preferred embodiment, such detail is intended to be instructive rather than restrictive. For example, the functions performed by the base station controller 20 shown in FIG. 5 may, in an alternative embodiment, be performed by a base station 14 coupled with either the originating or terminating nodes 40. The functions of a base station 14 may also be combined with the base station controller 20, to form a master base station. Additionally, different data rates and modulation schemes may be employed. It will be appreciated by those skilled in the art that many variations may be made in the structure and mode of operation without departing from the spirit and scope of the invention as disclosed in the teachings herein.

What is claimed is:

1. A method implemented by a base station for suppressing selective communications during communication rate modification, the base station being coupled between first and said second communicating nodes, the method comprising:

establishing a communication channel between said first and said second nodes at a first data rate;

detecting a transmission from said first node on said channel;

determining whether said transmission requires a change in data rates to a second data rate;

switching, responsive to said determining step, said communication channel to said second data rate; and blocking, responsive to said determining step, transmissions from said second node until said second data rate has been established.

2. The method of claim 1 wherein said detecting step detects tones at a plurality of selective frequencies and said tones initiate a change to said second data rate.

3. The method of claim 2 wherein said switching step switches said first data rate to said second data rate, which is higher data rate than said first data rate.

4. The method of claim 3 wherein said first data rate is 32 kb/s and said second data rate is 64 kb/s.

5. The method of claim 4 wherein said first data rate employs pulse code modulation and said second data rate employs adaptive pulse code modulation.

6. The method of claim 1 wherein said switching step is responsive to said determining step to switch said established channel to one of a plurality of alternative channels, depending upon a data rate and modulation type required by said transmission.

7. A method implemented by a base station for facilitating wireless communications between an originating node and a terminating node and for selectively adjusting transmission rates without the loss of data during the transmission rate adjustment, the base station being located such that at least a portion of the communication between said originating node and said terminating node passes through the base station, the method including:

establishing a first communication channel between said originating node and said terminating node, said channel comprising a first communication path from said originating node to said terminating node and a second communication path from said terminating node to said originating node;

monitoring said first communication path for a signal, said signal indicating the request for a transmission rate adjustment;

adjusting, responsive to said monitoring step, the transmission rate of said communication channel; and suppressing, responsive to said monitoring step, communications on said second communication path until the desired communication rate is established.

8. The method of claim 7 wherein said monitoring step detects signals having selective frequencies indicating a request for an increased transmission rate.

9. The method of claim 7 wherein said adjusting step switches said first communication channel to a second communication channel having a higher transmission rate.

10. The method of claim 9 wherein said first communication channel has a transmission rate of 32 kb/s and said second communication channel has a data rate of 64 kb/s.

11. The method of claim 9 wherein said first communication channel uses pulse code modulation and said second communication channel uses adaptive pulse code modulation.

12. The method of claim 7 wherein said signal indicates a transmission rate and a modulation type required and said adjusting step is responsive to said monitoring step to switch said channel to one of a plurality of alternative channels, depending upon a transmission rate and a modulation type required by said signal.

13. A method implemented by a wireless base station, which is interposed between a first communicating node and a second communicating node, for suppressing selective communications during channel modification, the method comprising:

establishing a first duplex communication channel between said first node and said second node comprising a transmit (Tx) portion and a receive (Rx) portion; said channel having a first data communication rate and modulation type;

detecting a transmission from said first node on said Tx portion;

determining whether said transmission requires a change to a second duplex communication channel having a second communication rate and modulation type;

switching said first communication channel to said second communication channel; and blocking transmissions on said Rx portion until said second communication channel is established.

14. The method of claim 13 wherein said detecting step detects selective transmitted frequencies on said Tx portion which indicate a requirement for a change to said second communication channel.

15. The method of claim 13 wherein said second communication rate is faster than said first communication rate.

16. The method of claim 13 wherein said first communication rate is 32 kb/s and said second communication rate is 64 kb/s.

17. The method of claim 13 wherein said first communication channel uses pulse code modulation and said second communication channel uses adaptive pulse code modulation.

18. The method of claim 13 wherein said switching step is responsive to said determining step to switch said established channel to one of a plurality of alternative channels, depending upon a communication rate and a modulation type required by said transmission.

19. A method implemented by a wireless base station for facilitating communications between a first communicating entity and a second communicating entity by selectively suppressing communications during bearer rate modification, the method comprising:

establishing a communication channel between said first entity and said second entity;

detecting a transmission from said first entity over said channel;

determining if a new communication channel is required;

switching over said communication channel to said new communication channel; and blocking transmissions from said second entity to said first entity until said switchover is completed.

20. A base station implementing a method of modifying its communication rate, the base station handling at least a portion of a communication between an originating node and a terminating node, the method comprising:

receiving a first communication from said originating node at a first communication rate;

detecting a request for a modification of said communication rate;

modifying said first communication rate to said requested communication rate;

transmitting said first communication at said first communication rate to said terminating node;

receiving an answering tone from said terminating node; and suppressing said answering tone until said modification is completed, and thereafter transmitting said answering tone to said originating node.

* * * * *

UNITED STATES PATENT AND TRADEMARK OFFICE
CERTIFICATE OF CORRECTION

PATENT NO. : 6,741,564 B2  
DATED : May 25, 2004  
INVENTOR(S) : Michael J. Luddy It is certified that error appears in the above-identified patent and that said Letters Patent is hereby corrected as shown below:

Title page,
Item [57], ABSTRACT,
Line 4, after the word "and", delete "said" and insert therefor -- the --.
Line 5, after the word "between", delete "said first and said" and insert therefor -- the first and the --.
Line 9, after the word "to", delete "said" and insert therefor -- the --.

Column 5,
Line 62, after the word "nodes", delete "40" and insert therefor -- 40, 44 --.

Signed and Sealed this

Twentieth Day of September, 2005

JON W. DUDAS  
*Director of the United States Patent and Trademark Office*